INFORMATION STORAGE SYSTEMS

Filed Jan. 22, 1957 4 Sheets-Sheet 1

INVENTOR
JOHN JOSHUA SHARP
BY Haane and Nydick
ATTORNEYS

INVENTOR
JOHN JOSHUA SHARP
BY Haine and Nydick
ATTORNEYS

Jan. 9, 1962 J. J. SHARP 3,016,523

INFORMATION STORAGE SYSTEMS

Filed Jan. 22, 1957 4 Sheets-Sheet 3

INVENTOR
JOHN JOSHUA SHARP
BY Haneand Nydick
ATTORNEYS

INVENTOR
JOHN JOSHUA SHARP
BY
Hane and Nydick
ATTORNEYS 3,016,523

INFORMATION STORAGE SYSTEMS

John Joshua Sharp, Stevenage, England, assignor to International Computers and Tabulators Limited, London, England, a British company Filed Jan. 22, 1957, Ser. No. 635,236
Claims priority, application Great Britain Jan. 26, 1956
9 Claims. (Cl. 340—174.1)

Figures 1, 2:
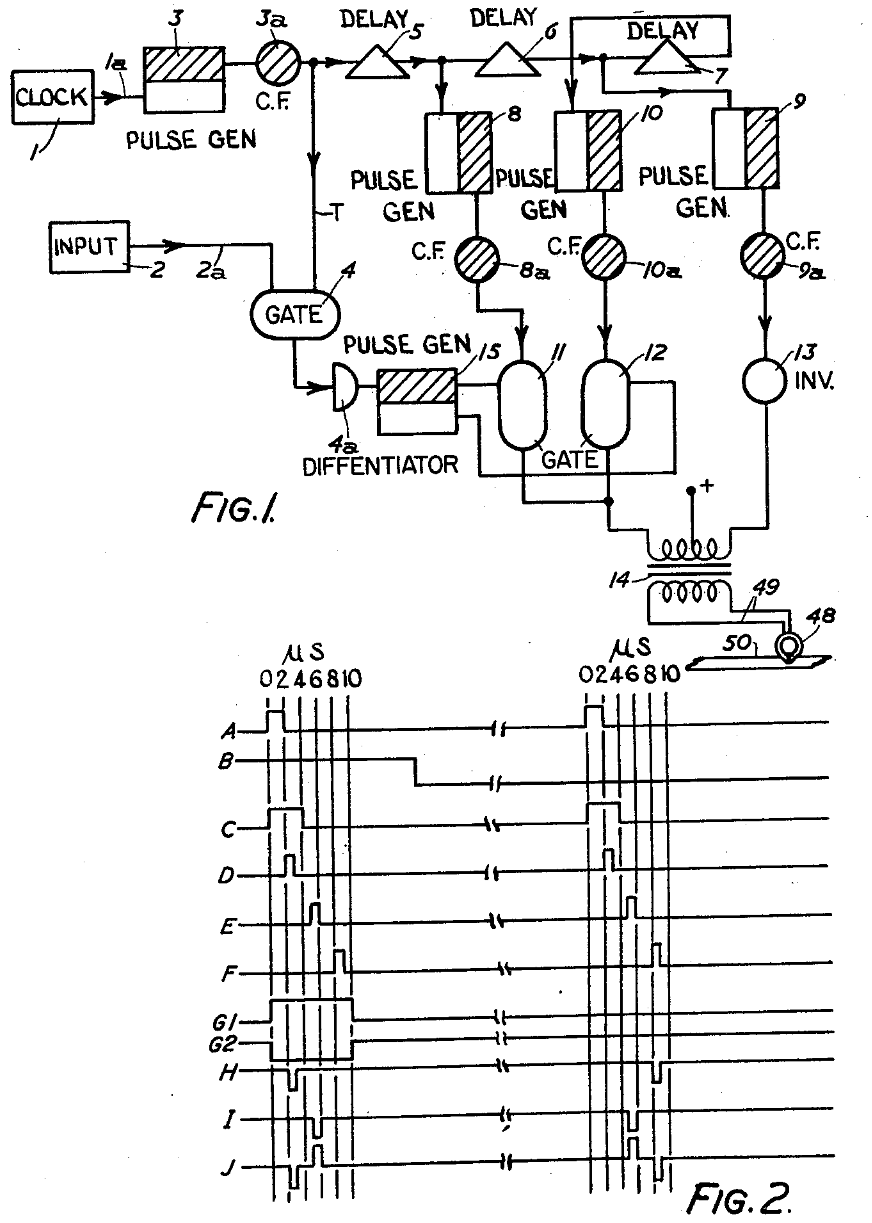

This invention relates to information storage systems in which the information is stored in the form of discrete areas of magnetisation on a magnetisable medium, such as magnetic tape, or a magnetic drum or disc.

It is usual to control the recording and reading of signals on the magnetisable medium by clock pulses which are synchronised with the movement of the medium. In the case of a magnetic drum, for example, the clock pulses are derived from a track which has a pulse prerecorded at every position at which a signal may be recorded on the information tracks. Alternatively, a phonic wheel or photo-electric pulse generator synchronised with the drum may be used. Similarly, a tape may have a clock track recorded on it.

The clock pulses serve to synchronise reading and recording, so that signals are recorded at known positions on the medium, and the output from a reading head can be sampled at the required time. In many cases the significance of the recorded signal is determined by the time relation between the output from the reading head and the clock pulses.

In the case of tape particularly, the use of a clock track appreciably reduces the area available for information storage. It also requires a high degree of uniformity in the magnetic characteristics of the tape, since there may be several information tracks which are recorded and read under control of a single clock pulse. Any degradation of the clock pulse due to tape characteristics will affect the corresponding position of all the information tracks.

It is an object of the invention to provide apparatus for magnetically recording binary signals in a manner facilitating read-out by a self-clocking method i.e. a method which does not require the use of a synchronised clock pulse source.

It is a further object of the invention to provide apparatus for performing a self-clocking read-out of magnetically recorded binary signals.

According to one aspect of the invention apparatus for recording binary signals comprises means for generating a group of at least three consecutive spaced pulses of alternately opposite polarity for each binary signal to be recorded, means responsive to an applied signal of one binary significance to select a consecutive pair of said pulses of one polarity sequence and responsive to an applied signal of the other binary significance to select a consecutive pair of said pulses of the opposite polarity sequence, and means for applying a selected pulse pair to a recording head, adapted to impress such pulses, as discrete areas of magnetization, upon a magnetisable medium.

According to another aspect of the invention apparatus for reading binary signals recorded on a magnetisable medium as discrete areas of magnetization representing pairs of pulses consisting of one pulse of each polarity each pair of which has a polarity sequence determined by the binary significance of the signal it represents, comprises means for deriving from said medium pairs of pulses consisting of a pulse of each polarity, each pair of which has a polarity sequence determined by the binary significance of the signal it represents, and for applying such pulse pairs in antiphase to two inputs of a gating circuit, said gating circuit being adapted to respond to a pulse of one polarity at one input to pass a pulse of the same polarity applied to the other input, whereby an output pulse is obtainable from said gating circuit only when the first occurring pulse of a pulse pair applied to said one input is of said one polarity.

Figure 3:
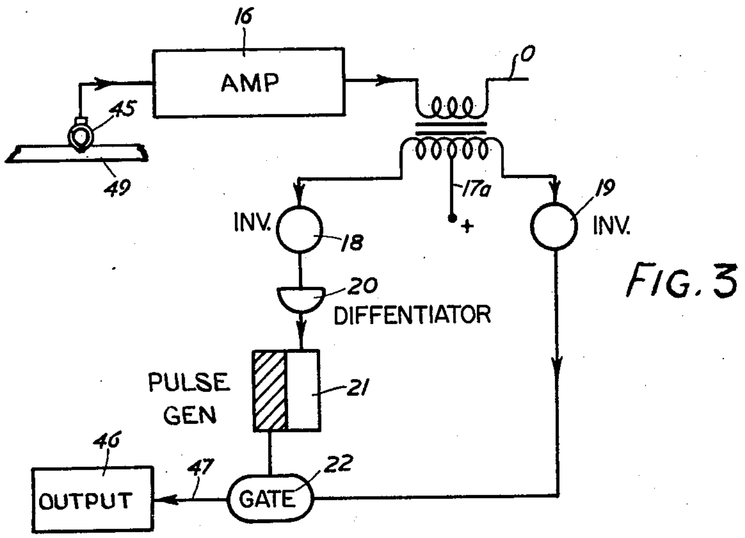
Figure 4:
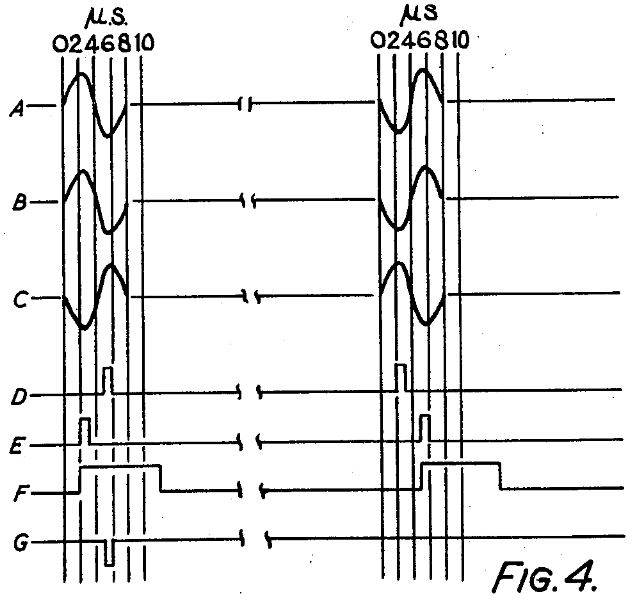
Figure 5:
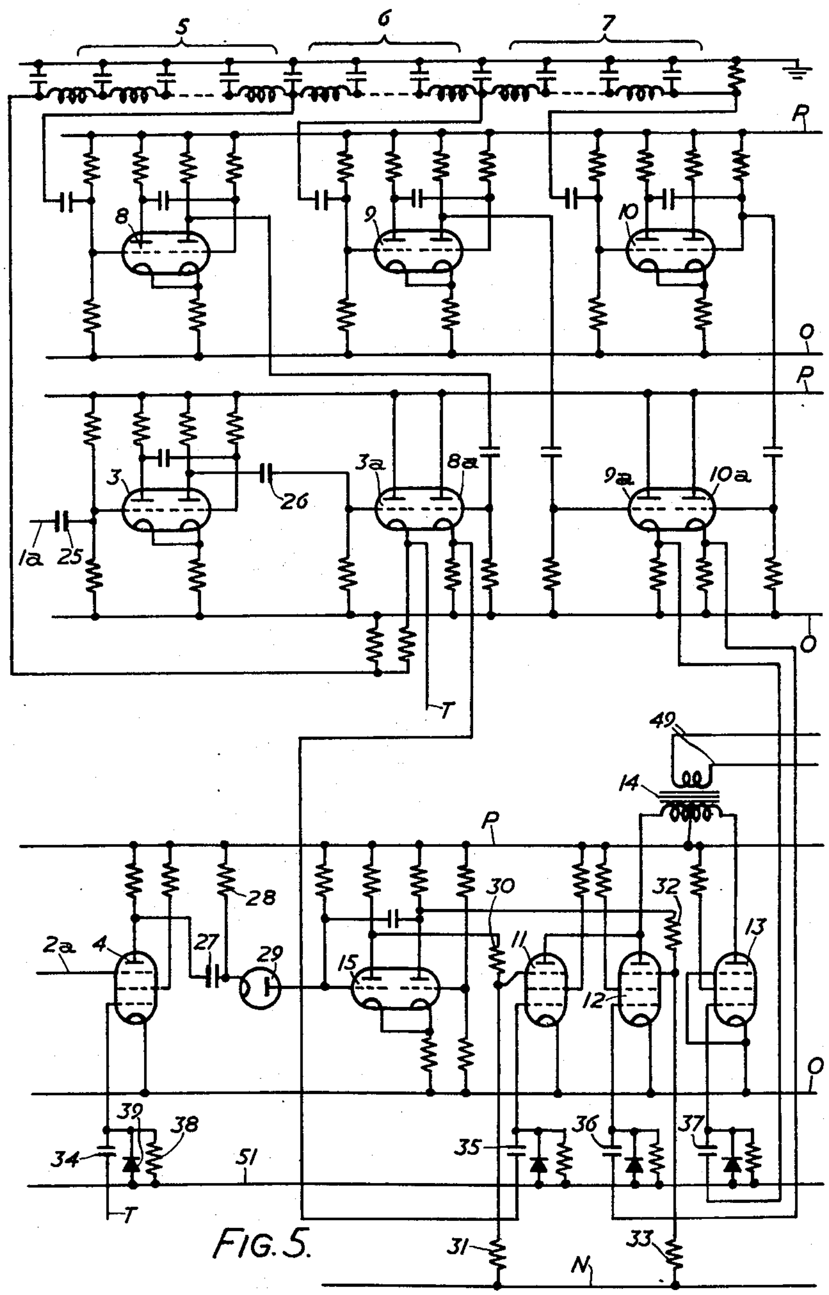
Figure 6:
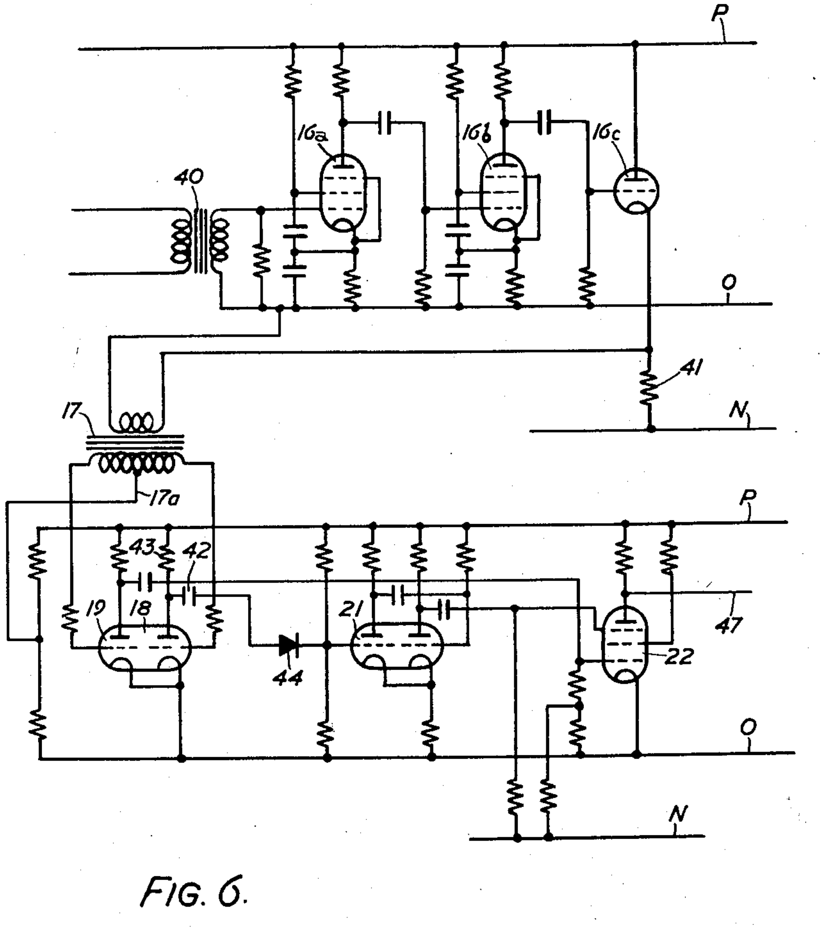

An embodiment of the invention will now be described, by way of example, with reference to the accompanying drawings, in which:

FIGURES 1 and 2 show respectively a schematic diagram of recording apparatus according to the invention and waveforms illustrating the operation of such apparatus, FIGURES 3 and 4 show respectively a schematic diagram of reading apparatus according to the invention and waveforms illustrating the operation of such apparatus, and FIGURES 5 and 6 show respectively detailed circuits of the arrangements of FIGURES 1 and 3.

In experimental operation of the embodiment to be described information was recorded on, and read from, a magnetic tape travelling at a speed of 100 inches per second with a signal packing density of 666 signals per inch. This gave a time interval of 15 $\mu$secs. between successive signals. The pulse widths and spacing in the various waveforms referred to in the following description are related to these conditions.

A binary signal, that is a signal having one or other of two possible meanings, e.g. "one" or "zero," is recorded as a pair of pulses, one of each polarity with a gap between the pulses of a pair, the polarity sequence for a "one" being opposite to that for a "zero."

The signals to be recording are generated in binary form by an input device 2 (FIGURE 1), being relatively high and low voltage levels for a "zero" and a "one," respectively (B, FIGURE 2). Clock pulses (A, FIGURE 2) are supplied from a clock pulse source 1. These pulses are not synchronised with the tape in any way, but are generated by the apparatus, such as a computer, which is producing the information signals on the input device 2. They are necessary to convert the D.C. information signals to pulse form for recording as discrete areas of magnetisation on the tape.

Each clock pulse from the source 1 triggers a test pulse generator circuit 3 to produce an output pulse (C, FIGURE 2) of 4 $\mu$sec. duration which is applied through a cathode follower 3*a* to a zero test gate 4. The gate 4 is arranged to be opened by a "zero" signal from the input device 2 but to remain closed when a "one" signal is supplied from the input device 2. The output pulse from circuit 3 is also applied to a delay circuit indicated by the three delay elements 5, 6 and 7.

The delays introduced by these elements eventually determine the spacing between the two pulses used for recording each signal, and this spacing is chosen to be approximately equal to the time taken for a point in the recording medium to cross the gap in the recording head. At a feed rate of 100 inches/second for the recording medium and with a gap of 0.5 thousandths of an inch in the recording head, the spacing would be 2 $\mu$secs. and in the following description it will be assumed that these values apply. It will also be assumed that the duration of the recording pulses is in each case 1 $\mu$sec.

Delay element 5 introduces a delay of 2 $\mu$secs. for reasons explained later, and elements 6 and 7 each introduce a delay of 3 $\mu$secs., so that the test pulse from circuit 3 is applied to each of three recording pulse generator circuits 8, 9 and 10 in turn. Each of these generator circuits is arranged to be triggered by the test pulse to produce a 1 $\mu$sec. recording pulse (D, E, and F, FIGURE 2).

The recording pulses from the circuits 8 and 10 are respectively applied through cathode followers 8*a* and 10*a* to gates 11 and 12. The recording pulse from the circuit 9 is applied through a cathode follower 9*a* and an inverter 13 to one half of the split primary of a transformer 14 which feeds, over a line 49, a recording head 48 associated with a magnetic tape 50.

When the zero test gate 4 is opened by the application of a "zero" signal from the input device 2, the test pulse from circuit 3 passes through to a differentiating circuit 4*a*, and the differentiated pulse is applied to trigger a strobe pulse generating circuit 15, which is a monostable trigger circuit and produces output pulses (G1 and G2, FIGURE 2) of 10 μsecs. duration. These strobe pulses are applied to control gates 11 and 12 respectively in such a manner that the former is opened by the strobe pulse, and the latter is closed by the pulse. The outputs of both gates 11 and 12 are applied to the other half of the primary winding of the transformer 14.

Thus, a clock pulse from the source 1 first generates a test pulse which passes through the test gate 4 if the signal supplied by the input device 2 represents a "zero," but which is suppressed if this signal represents a "one." 2 μsecs. later a first recording pulse is generated by the pulse generator 8 and passes through gate 11 to the recording head circuit only if the gate 11 is opened as the result of the passage of the original test pulse through the gate 4, i.e. if the input signal represents a zero.

The 2 μsec. delay in generating the first recording pulse permits operation of circuit 15 in response to a test pulse passed through gate 4, and the opening of gate 11 by the strobe pulse from circuit 15 before the arrival of the first recording pulse at the latter gate.

At 3 μsec. intervals after the generation of the first recording pulse, a second and third recording pulse are generated, the second pulse being inverted by the inverter 13 and fed to the transformer 14, and the third pulse passing through gate 12 if a "one" signal is supplied by the input device 2 or being suppressed if the input signal represents a "zero."

Thus the second pulse is always fed to the transformer 14, and it is either preceded by the first recording pulse, or followed by the "third" recording pulse, in dependence upon whether the input signal represents a "zero" or a "one."

The operation of the recording arrangement in response to a "zero" signal followed by a "one" signal is illustrated by the waveforms of FIGURE 2, wherein, in addition to the waveforms already referred to, there are shown at H the first recording pulse as passed by gate 11 and the third recording pulse as passed by gate 12, at I the second recording pulse in inverted form, and at J the output waveform of the transformer 14. From waveform J it will be seen that the recording signals corresponding to a "zero" input signal are a negative-going pulse of 1 μsec. duration followed 2 sec. later by a positive-going 1 μsec. pulse, and that in the case of a "one" input signal the positive-going 1 μsec. pulse appears before the negative-going pulse, that is, the polarity sequence of the pair of pulses representing a "one" is opposite to that of the pair of pulses which represent a "zero."

It will be appreciated that clock pulses are necessary to sample the input signal at successive digit times to determine which digit is represented, since successive digits of the same kind are represented by a continuous signal of the appropriate level.

Other forms of input signal may be dealt with by suitably modifying the input circuit. For example, the input signal may consist of a positive pulse for "one" and a negative pulse for "zero." The input signal is applied directly to the differentiating circuit 4*a*, so that the circuit 15 is set for "zero" in the manner already described, the gate 4 being dispensed with. The input signal is also applied to the pulse generator 3, instead of the clock pulses. The pulse generator is modified to produce an output pulse for each input pulse irrespective of polarity. The remainder of the circuit then operates in the manner already described.

In the schematic diagram of FIGURE 1 the various pulse generating circuits have been indicated as monostable trigger devices, or flip-flops, but it is to be understood that this is simply a schematic representation, and that any circuits capable of giving the desired output pulses in response to the pulses applied may be used.

The reading, by a self-clocking method, of a recording in which binary digits are represented by pulse pairs of opposite polarity sequences, such as the recording produced by the arrangements disclosed above will now be described with reference to FIGURES 3 and 4. It will be assumed in the following description that the feed rate of the recording medium and the reading head gap are once again respectively 100 inches/second and 0.5 thousandths of an inch.

The signal picked up by a reading head 45 from a magnetic tape 49 is of the form shown at A in FIGURE 4, and this is fed to a pre-amplifier 16 (FIGURE 3), the output of which is applied to the primary winding of a transformer 17, the secondary winding of which is center tapped, as represented by the connection 17*a* in FIGURE 3. The ends of the secondary winding of this transformer are respectively connected to two square wave generators 18 and 19, so that the input signal is fed in antiphase to these two generators as indicated at C and B respectively in FIGURE 4.

The generators 18 and 19 are normally held fully conducting by a positive voltage applied to the centre tap of the transformer over connection 17*a*. When a negative signal, of amplitude greater than the bias applied to the center tap of transformer 17, is applied to the generator 18, it produces a positive pulse in its output circuit as shown by E in FIGURE 4. Similarly when a sufficiently large negative pulse is applied to the generator 19, it produces a postive pulse in its output circuit as shown by D in FIGURE 4.

It will be seen from A, B and C, FIGURE 4 that each signal picked up by the reading head produces a positive pulse in the output circuit of generators 18 and 19, the pulse generated by generator 18 occurring first in response to a "one" signal and that generated by generator 19 occurring first in response to a "zero" signal.

The pulse output of generator 18 is applied to a differentiating circuit 20, and the differentiated pulse is applied to trigger a strobe pulse generator 21 which is a monostable trigger circuit. The strobe pulse output of this latter generator, shown at F FIGURE 4, is of 10 μsec. duration, and is applied to open a gate 22 for this period. The gate 22 is also fed with the output pulse of generator 19, which pulse passes through the gate to register a "one," if it occurs after the pulse from generator 18. The pulse from generator 19 is however suppressed if it arrives at gate 22 before the pulse from generator 18 has initiated generation of the gate opening strobe pulse, and the absence of output from the gate under these circumstances registers a zero signal.

Output signals from the gate 22 are passed over line 47 to a suitable output utilisation device 46, which may, for example, consist of a register or calculating apparatus.

In FIGURE 4 the waveforms D and F show a pulse from generator 19 occurring during the strobe pulse and occurring before the strobe pulse, and the resultant output from the gate 22 is indicated, in each case, in waveform G.

The particular form of signal obtained from the reading head i.e. the positive going pulse merging into a negative going pulse for a "one" signal, is, in the present case, predetermined by the spaced double pulse method of recording employed, the spacing being chosen in relation to the effective gap width of the reading head to result in the merging of the two pulses to produce the desired rapid cross-over. It will be appreciated however, that the reading arrangements can be employed to read any form of recording which provides waveforms including two portions of alternating polarity, with the order of alternation reversed for the two binary signals.

As with the recording arrangements of FIGURE 1, the strobe pulse generator 21 of FIGURE 3 has been indicated schematically as a monostable trigger device or flip-flop but it could of course comprise any suitable device capable of generating a pulse of appropriate duration in response to an applied pulse.

FIGURE 5 shows circuit details of the arrangement shown schematically in FIGURE 1, the same references being used to indicate the same circuit elements in both figures. The clock pulse input line *1a* is connected via capacitor 25 to the lefthand grid of a double triode 3, connected as a monostable trigger, and arranged to respond to the positive going edge of an applied clock pulse to generate a test pulse of 4 μsecs. duration. The output pulse of generator 3 is applied through capacitor 26 to grid of a cathode follower *3a* constituted by the lefthand triode section of the double triode *3a*, *8a* and the cathode output of this section is applied to the input of a delay line 5, 6, 7 and over line T to the control grid of a gate valve 4, to the suppressor grid of which the signal input is applied over line *2a*.

The pulse applied to the delay line reaches a tapping to which the lefthand control grid of a double triode 8, arranged as a monostable trigger, is connected, after a delay of 2 μsecs. This trigger is arranged to respond to the positive edge of the pulse from the delay line to generate a positive pulse of 1 μsec. duration. Similar triggers 9 and 10 respond to the same pulse from a further tapping on, and from the end of, the delay line respectively, the delay being a further 3 μsecs. in each case.

The 1 μsec. pulse from trigger 8 is applied to the grid of a cathode follower *8a* constituted by the righthand triode section of the double triode *3a*, *8a* and the similar pulses from triggers 9 and 10 are applied to the left and righthand grids of a pair of cathode followers *9a* and *10a* constituted by the two triode sections of a double triode *9a*, *10a*. The cathode output pulses of these three cathode followers are applied to the control grids of valves 11, 13 and 12 respectively.

The gate valve 4 is controlled by the signals applied to its suppressor so as to be cut off when a "one" signal is present on line *2a* and to prevent an output pulse being produced in response to the test pulse applied to its control grid on line T. With a "zero" signal on line 2 the potential on the suppressor grid of valve 4 is raised to the level of the cathode and so the valve conducts when the test pulse is applied to the control grid. The resultant output pulse is differentiated by capacitor 27 and resistor 28, together constituting the element *4a* of FIGURE 1, and the differentiated leading edge of the pulse is applied through a diode 29 to the lefthand grid of a double triode 15 arranged as a monostable trigger. Trigger 15 responds to an applied pulse to generate a strobe pulse of 10 μsecs. duration during which the lefthand anode of the trigger is at high potential and the righthand anode is at low potential. These anodes are connected to one end of potential dividers formed by pairs of resistors 30 and 31, and 32 and 33 respectively, the other ends of which are connected to a negative potential line N and the junctions between the resistors of the pairs are connected to the suppressor grids of valves 11 and 12.

The control grids of valves 4, 11, 12 and 13 are connected through individual capacitors 34, 35, 36 and 37 to the line T, and to the cathodes of valves *8a*, *10a* and *9a* respectively and also to a negative bias line 51 through a resistor, such as 38, and a diode, such as 39, in each case. These connections result in gate 11 being open to pass a pulse applied from valve *8a*, and gate 12 being closed to inhibit a pulse applied from valve *10a*, 6 μsecs. later, when there is a zero signal on line *2a*, and in a reversal of these gating conditions when there is a "one" signal on line *2a*. In both cases a pulse from valve *9a* is passed by valve 13.

The anodes of gates 11 and 12 are connected in common to one side of a center-tapped primary winding of transformer 14 and the anode of a valve 13 is connected to the other side of this winding, the center tap being connected to the positive supply line P. The secondary winding of transformer 14 is connected to a conventional recording head 48 (FIGURE 1) by means of lines 49.

FIGURE 6 shows circuit details of the reading arrangements of FIGURE 3 the same references being used in the two figures for the same circuit elements. The preamplifier, (16 in FIGURE 3) comprises a two stage RC coupled amplifier 16A, 16B of conventional type followed by a cathode follower 16C. The input to the preamplifier from the reading head 45 (FIGURE 3) is applied to the primary winding of a step up transformer 40, the secondary winding of which is connected between the control grid of valve 16A and the zero potential line O. The cathode of the cathode follower is connected through load resistor 41 to the negative potential line N and the output is applied to the primary winding of the transformer 17, which is connected between the cathode and the line O. The secondary winding of transformer 17 is center-tapped to a point of positive bias on a voltage dividing network connected between the positive supply line P and the zero potential line O. The ends of the secondary winding of transformer 17 are connected to the grids of the two triode sections 19 and 18 of a double triode. The anode of the righthand section 18 is connected to the lefthand grid of a further double triode 21 arranged as a monostable trigger, through a differentiating circuit consisting of capacitor 42 and resistor 43 and corresponding to element 20 of FIGURE 3, and through a diode 44. The diode 44 is connected in such a way that only the positive-going differentiated pulse is applied to trigger 21. The anode of the left-hand triode section 19 is connected to the control grid of a pentode gate valve 22.

Both sections 18 and 19 are arranged to be normally conducting but when a negative signal of amplitude greater than the positive bias level of the center tap of transformer 17 is applied to the grid of either section the corresponding anode potential rises to give a positive-going output pulse. The order in which the two sections produce such output pulses depends upon the nature of the signal input. Thus if a "one" signal is applied i.e. a positive pulse followed by a negative pulse, the output pulse from triode section 18 occurs before that from the triode section 19. The output pulse from the triode section 18 switches the double triode 21, and causes a positive-going pulse of 10 μsecs. duration to be applied to the suppressor grid of gate 22 from the right-hand anode of the triode 21.

The gate 22 will give an output pulse only when its control and suppressor grids receive pulses simultaneously. Thus, if the output pulse from triode section 19 occurs before that from the section 18, the signals on the grids of the gate 22 do not coincide, and the gate 22 does not provide an output. When, however, the pulse from the triode section 18 precedes that from the section 19 the action of the trigger 21 prolongs the pulse applied to the suppressor grid of the gate 22 and the signal on the control grid of the gate occurs during this period. An output pulse is therefore generated by the gate 22 for this condition, which corresponds to a "one" input signal from the reading head 45. Hence, impulses from the gate are applied over the wire 47 to any suitable output utilisation device only when a "one" signal is sensed by the reading head 45.

What is claimed is:

1. Apparatus for recording binary signals comprising means responsive to each binary signal to be recorded to generate a group of at least three pulses occurring at successive spaced instants of time, successive pulses of said group being of opposite polarity to one another, means responsive to an applied binary signal of one significance to select a consecutive pair of said pulses of one polarity sequence and responsive to an applied binary signal of the other significance to select a consecutive pair of said pulses of the opposite polarity sequence, a recording head, and means for applying a selected pulse pair to the recording head, said recording head being adapted to impress such pulses, as discrete areas of magnetization, upon a magnetisable medium.

2. Apparatus as claimed in claim 1 in which said group generating means comprises a pulse generator connected to supply pulses to at least three delay means and means for deriving each pulse of said group from a different one of said delay means at a different instant of time, said deriving means including means for effecting relative inversion of polarity of consecutive pulses of said group.

3. Apparatus as claimed in claim 2, in which there is provided means for deriving a test pulse directly from said pulse generator and said pulse pair selection means is responsive jointly to said test pulse and a signal of a predetermined binary significance.

4. Apparatus as claimed in claim 3, in which said selection means includes an input gate adapted to have said test pulse and a signal to be recorded applied thereto and operative to pass said test pulse only if said signal is of said predetermined binary significance.

5. Apparatus as claimed in claim 1 in which said pulse pair selection means comprises a strobe pulse generator operable in response to a signal of a predetermined binary significance and in which said pulse group is applied to a gating means, said gating means being controllable by said generator and operative to suppress a first pulse of said group if said strobe generator is operated and a third pulse of said group respectively if said strobe pulse generator is not operated.

6. Apparatus as claimed in claim 5 in which said strobe pulse generator is constituted by a monostable trigger device adapted to be switched to its unstable state in response to a test signal from said input gate and to revert to its stable state in the time interval between successive signals applied thereto.

7. Apparatus as claimed in claim 6 in which said gating means is operative to suppress said third pulse in response to a binary "zero" signal applied to said selection means whereby such binary "zero" signal results in the selection of said first and second pulses, and is operative to suppress said first pulse in response to a binary "one" signal applied to said selection means whereby such binary "one" signal results in the selection of said second and third pulses.

8. Apparatus as claimed in claim 1, in which said generating means comprises a pulse generator connected to supply pulses to at least three delay means, said delay means being constituted by electrical delay line sections, and means for deriving each pulse of said group from a different one of said delay means, said deriving means including means for effecting relative inversion of polarity of consecutive pulses of said group.

9. Apparatus for recording binary signals comprising means responsive to each binary signal to be recorded to generate a group of three discrete pulses occurring at successive spaced instants of time, the second pulse of each group being of the opposite polarity to the other two, means responsive to an applied binary signal of one significance to select and first and second pulses of the group of pulses generated in response to that signal, means responsive to an applied binary signal of the other significance to select the second and third pulses of the group of pulses generated in response to that signal, a recording head, and means for applying the selected pulses to the recording head, said recording head being adapted to impress such pulses, as discrete areas of magnetization, upon a magnetizable medium.

References Cited in the file of this patent

UNITED STATES PATENTS

| | | |
|---|---|---|
| 2,540,654 | Cohen et al. | Feb. 6, 1951 |
| 2,633,402 | Fleming | Mar. 31, 1953 |
| 2,700,155 | Clayden | Jan. 18, 1955 |
| 2,729,809 | Hester | Jan. 3, 1956 |
| 2,734,186 | Williams | Feb. 7, 1956 |
| 2,793,344 | Reynolds | May 21, 1957 |
| 2,804,605 | De Turk | Aug. 27, 1957 |
| 2,853,357 | Barber | Sept. 23, 1958 |
| 2,864,077 | De Turk | Dec. 9, 1958 |
| 2,864,078 | Seader | Dec. 9, 1958 |
| 2,876,058 | Kenosian et al. | Mar. 3, 1959 |

OTHER REFERENCES

"Techniques for Increasing Storage Density of Magnetic Drum Systems" (Fuller et al.), Proceedings of the Eastern Joint Computer Conference, Dec. 8–10, 1954, pp. 16–21.